Oct. 19, 1926.
C. L. STARKEY
1,604,105
TIMING GEAR
Filed May 1, 1924    2 Sheets-Sheet 1
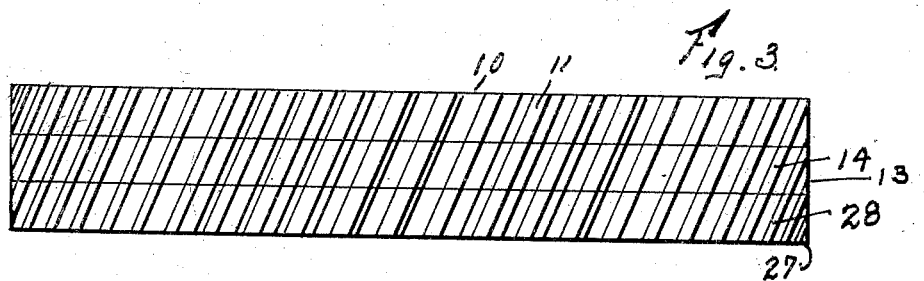
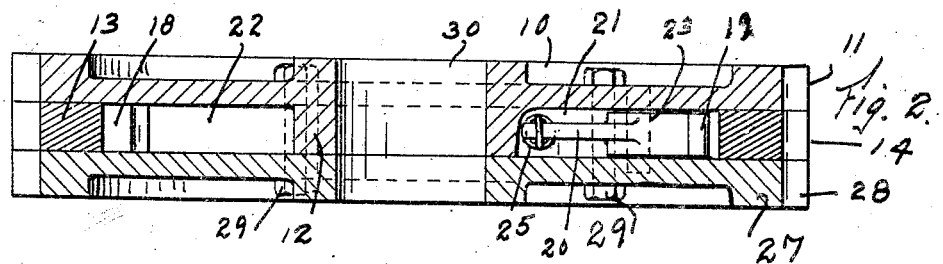
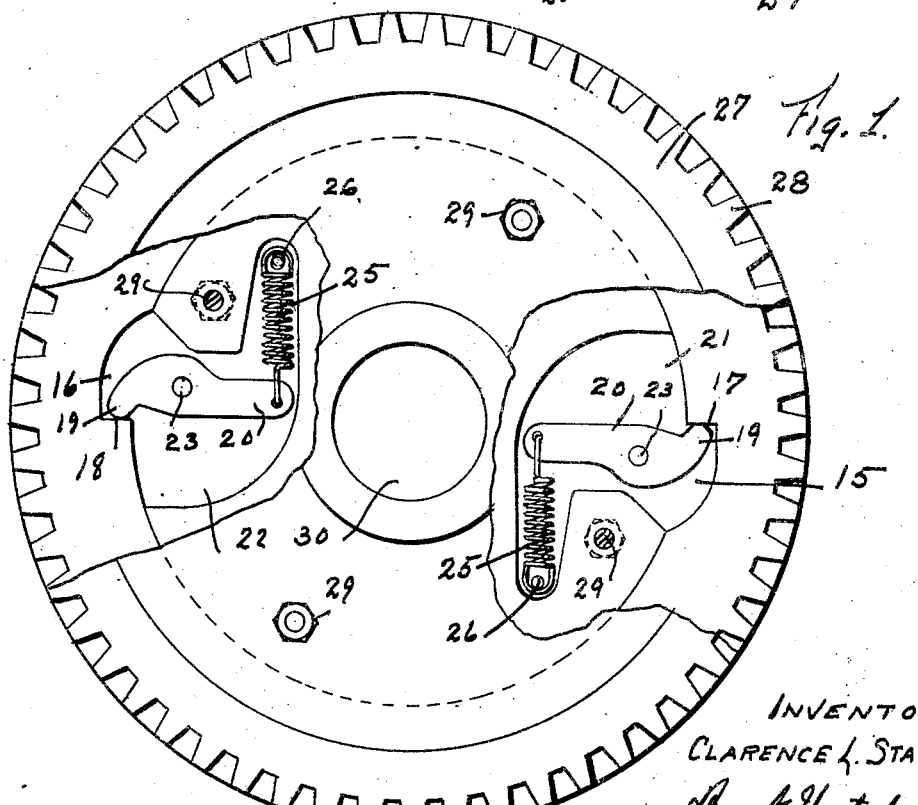
INVENTOR
CLARENCE L. STARKEY
by
ATTORNEY

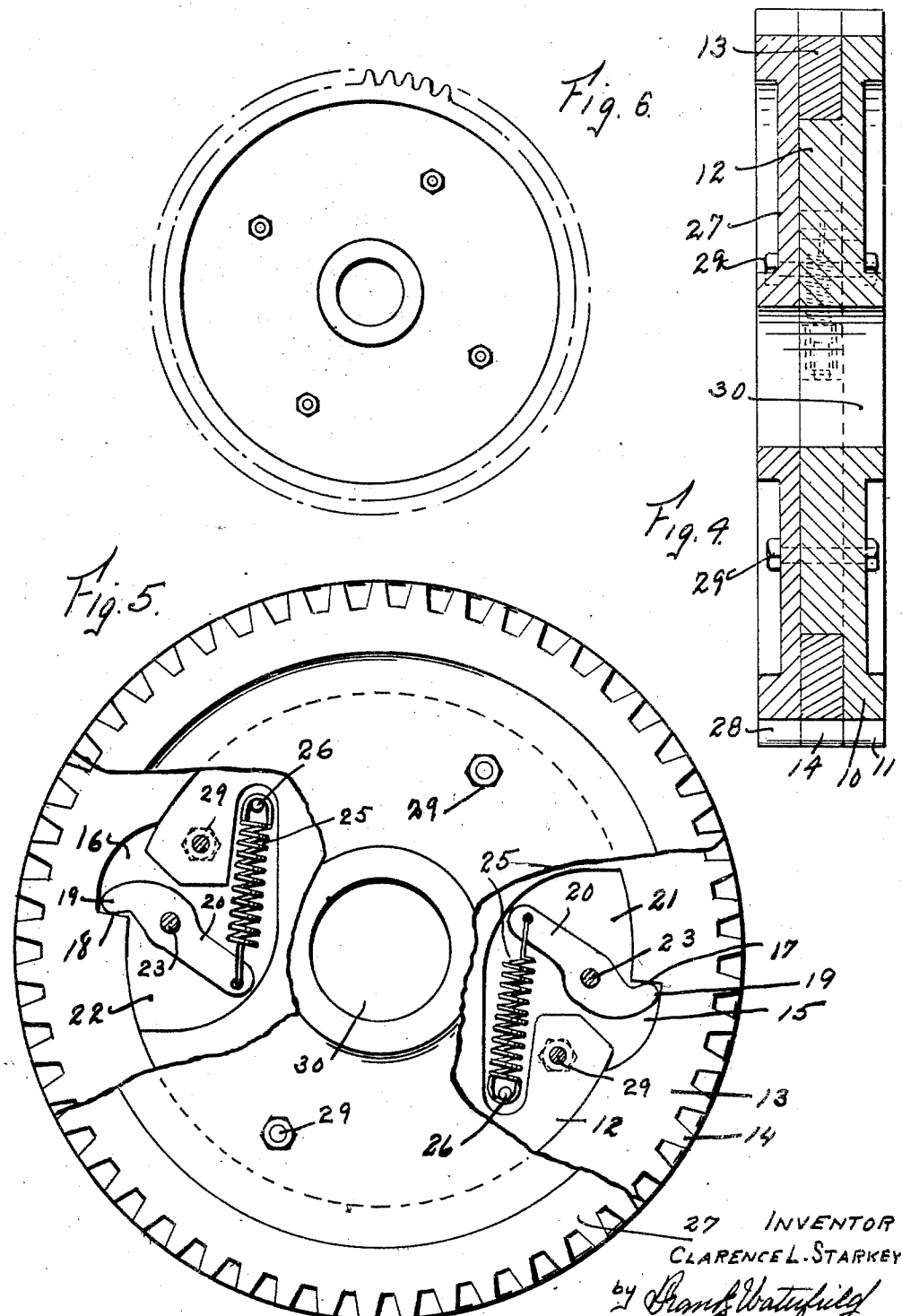

Patented Oct. 19, 1926.

1,604,105

UNITED STATES PATENT OFFICE.

CLARENCE L. STARKEY, OF FRESNO, CALIFORNIA.

TIMING GEAR.

Application filed May 1, 1924. Serial No. 710,246.

My invention relates to timing gears for use in explosion engines, particularly auto vehicle engines.

Heretofore, in the present type of timing gears, when the gears become slightly worn considerable annoyance is caused due to the backlash causing a grinding or similar annoying sound and also rendering the timing uncertain. In order to remedy this defect it has been necessary to either set the gears tightly together, causing excessive friction, or else to renew the gears frequently.

It is the object of my invention to provide a timing gear equipped with suitable means for automatically maintaining the proper tension between the timing gears to hold the same in proper operative engagement, thereby eliminating backlash and the unpleasant noises incidental thereto.

Other objects and advantages will appear hereinafter and, while I have shown and will describe the preferred form of my invention, I wish it understood that I do not limit myself to such preferred form, but that various changes and adaptations may be made therein without departing from the spirit of my invention.

In the drawings accompanying and forming a part hereof:

Fig. 1 is a side elevation, partly broken away, of one of my timing gears in its inoperative position.

Fig. 2 is a central horizontal section of Fig. 1.

Fig. 3 is a top plan of Fig. 1.

Fig. 4 is a central vertical section of Fig. 1.

Fig. 5 is a view similar to Fig. 1, showing my device in its operative position.

Fig. 6 is a side elevation, on a reduced scale, of my device equipped for a chain drive.

Referring to the drawings, my device comprises a disc 10 provided around its outer periphery with gear teeth 11. Projecting from one side of disc 10, concentric and preferably integral therewith, is a hub 12, and revolubly mounted upon the outer periphery of this hub is a ring 13, the outer periphery of which ring is provided with gear teeth 14 which coincide with gear teeth 11 on disc 10 and form a continuation thereof. Provided in the inner periphery of ring 13, in opposed relation, are recesses 15 and 16. Recesses 15 and 16 are substantially of the configuration of ratchet teeth, the square ends 17 and 18 of which are engaged by the noses 19 of pawls 20. Pawls 20 are pivotally mounted within recesses 21 and 22 formed in hub 12, by means of pintle bolts 23. The free ends of pawls 20 are connected to one end of coil springs 25, the other ends of which are rigidly mounted upon studs 26 extending outwardly from the inner face of recesses 21 and 22. A disc 27, provided around its outer periphery with gear teeth 28, similar to teeth 11 and 14 and coinciding with and forming a continuation thereof, is rigidly secured to member 10 by means of bolts 29, whereby members 10 and 27 are rigidly secured together to move in unison, while ring 13 is mounted rotatably therebetween. An aperture 30 projects centrally through members 12 and 27 for the reception of the usual shaft.

In Fig. 6 I have shown my device provided with sprocket teeth for use in silent chain drives and the like.

In the use of my device the parts will normally be positioned as shown in Fig. 1. When the device is being positioned for use ring 13 will be rotated around hub 12 so that the teeth on said ring will be set back one tooth further than the teeth 11 and 28, thereby moving the pawls 20 into the position shown in Fig. 5. It will then be brought into mesh with its companion gears, which are of the usual type, thereby holding members 10, 13 and 27 in their adjusted positions. When the engine is being operated, or the gears rotated, springs 25 will tend to move pawls 20 to their normal positions, thereby compensating for any wear of the teeth in any of the gears. While I have shown and described my device as being set back one tooth, it will be understood that any desired number of teeth within its limits may be used.

Having described my invention, what I claim is:

1. A timing gear for explosion engines comprising a disc having peripheral teeth and a hub extending from one side thereof concentric therewith; a ring rotatably mounted upon said hub having peripheral teeth coinciding with the teeth of said disc; a disc detachably secured upon the side of said hub having peripheral teeth coinciding with the teeth of said ring and said first disc; a pair of notches in the inner periphery of said ring on opposite sides thereof; a pair of recesses in said hub in juxtaposition to said notches; a pawl pivotally mounted between its ends in each of said recesses to extend radially having one end in engagement with its respective notch in said ring; a coil spring mounted in each recess having one end connected to the other end of said pawl and its other end secured to said disc adapted to rock said pawls to cause relative rotation between said ring and disc.

2. A timing gear for explosion engines and the like comprising a disc having peripheral gear teeth and a central shaft opening; a hub projecting from one side of said disc, concentric therewith; a ring mounted upon the outer periphery of said hub having peripheral gear teeth adapted to coincide with said first mentioned gear teeth; a disc detachably secured to said first mentioned disc adapted when positioned for use to hold said ring positioned for use and having peripheral gear teeth and a central shaft opening, the teeth of all of said members being adapted to coincide with each other; and means between said first disc and said ring adapted to impart relative rotation between the same—comprising a pair of opposed notches in the inner periphery of said ring; a pair of recesses in said hub coinciding with said notches; a dog pivotally mounted intermediate its ends in each of said recesses having one end engaging its respective notch in said ring; and means engaging the other end of said dogs adapted to rock the same to cause said relative rotation.

In witness that I claim the foregoing I have hereunto set my hand this 27th day of March, 1924.

CLARENCE L. STARKEY.